United States Patent [19]
Henig et al.

[11] 4,113,888
[45] Sep. 12, 1978

[54] ADSORPTION PROCESS

[75] Inventors: Yair Steve Henig, Pearl River; Kailash S. Purohit, Spring Valley, both of N.Y.

[73] Assignee: General Foods Corporation, White Plains, N.Y.

[21] Appl. No.: 771,486

[22] Filed: Feb. 24, 1977

[51] Int. Cl.$^2$ .................. A23F 1/10; B01D 15/02
[52] U.S. Cl. ........................ 426/422; 210/33; 210/34; 210/40
[58] Field of Search .............. 210/24, 30 R, 32, 33, 210/34, 40; 426/271, 386, 387, 422, 427, 428

[56] References Cited
U.S. PATENT DOCUMENTS

| | | | |
|---|---|---|---|
| 2,797,190 | 6/1957 | Scott et al. | 210/34 |
| 3,803,030 | 4/1974 | Montanaro et al. | 210/34 |
| 4,031,251 | 6/1977 | Margolis et al. | 210/32 |

Primary Examiner—Charles N. Hart
Assistant Examiner—Ivars Cintins
Attorney, Agent, or Firm—Thomas R. Savoie; Bruno P. Struzzi

[57] ABSTRACT

The selectivity of an adsorbent for the preferential adsorbed component of a multi-component aqueous solution is improved by means of passing an aqueous solution of the adsorbed solids eluted from the most spent stage of a multi-stage countercurrent adsorption process through a freshly regenerated bed of the same absorbent. By means of this process the preferentially adsorbed component is concentrated in the fresh bed. This invention is useful in decaffeinating aqueous coffee extracts.

10 Claims, 1 Drawing Figure

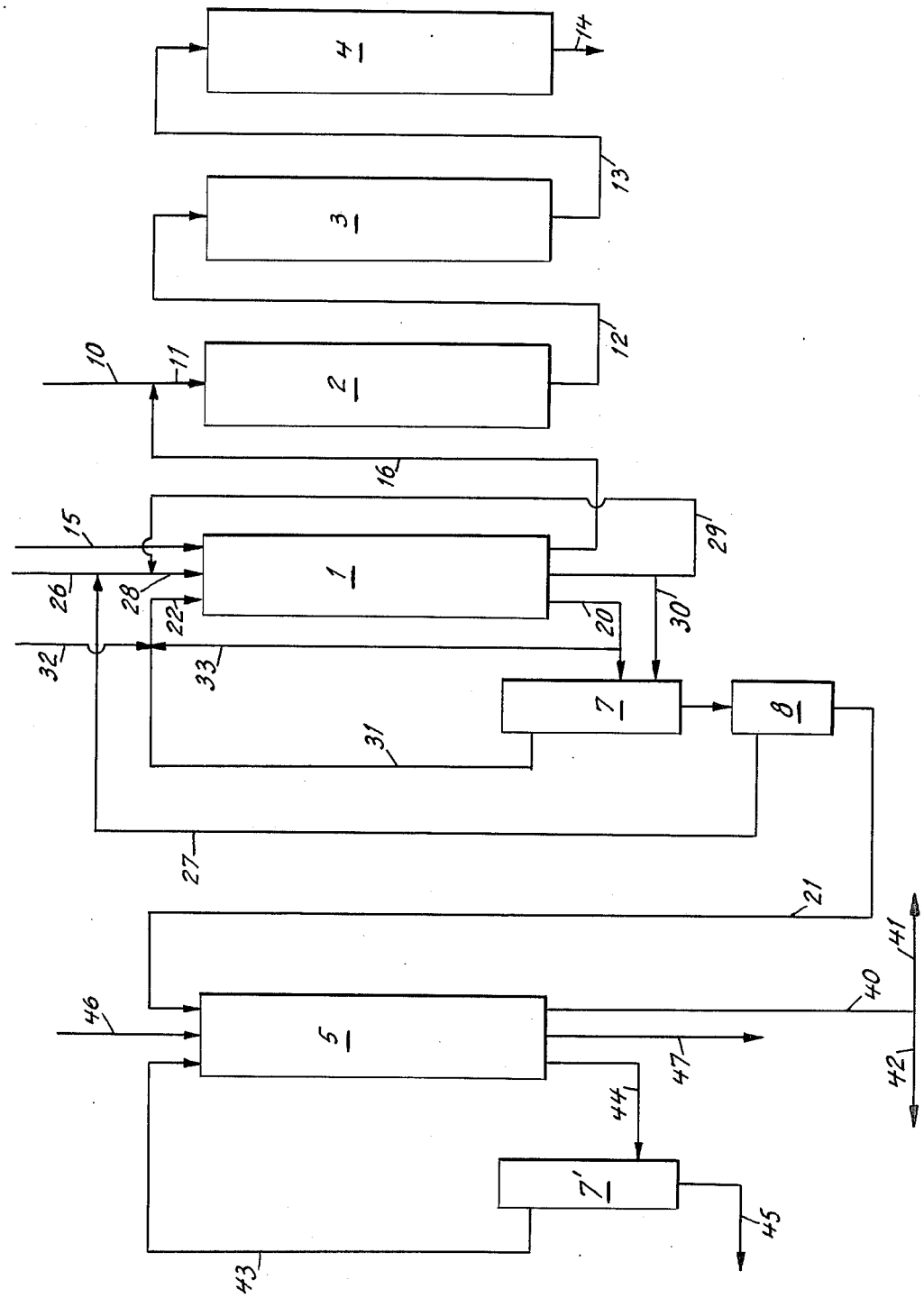

ADSORPTION PROCESS

BACKGROUND OF THE INVENTION

The use of a hydrophobic adsorption medium for removing a dissolved compound from an aqueous solution is a well-known and relatively straight-forward process when a two-component mixture is being separated. Adsorption processes intended to selectively remove one component from a multi-component system could also be relatively uncomplicated if the adsorption medium were exclusively selective for one of the components. Unfortunately, this is seldom if ever the case and, if it is desired to remove a single compound from a complex mixture of chemical compounds in aqueous solution, such as aqueous food extracts, various new processing schemes must be developed and employed.

It has been found that when aqueous coffee extracts are contacted with presently available adsorption mediums capable of adsorbing caffeine numerous other compounds, most notably chlorogenic acid, are also adsorbed by the adsorbent such that caffeine constitutes only a minor amount of the total solids adsorbed. Such a process would be economically unattractive unless a technique were developed for recovering and adding-back a significant portion of the non-caffeine solids which would be lost if only classical adsorption procedures were employed.

SUMMARY OF THE INVENTION

This invention is directed to an improvement in a countercurrent, adsorption process wherein a multi-component aqueous solution is essentially freed of one component while the loss of other components is minimized. Specifically this invention is suitable for decaffeinating aqueous extracts of green or roasted coffee having a soluble solids level of 15 to 30%, while minimizing the loss of non-caffeine solids. Although this invention will be described in terms of decaffeinating an aqueous coffee extract in a multi-stage, fixed-bed adsorption system it will be apparent to those skilled in the art that the process steps set out herein will be applicable to a wide variety of systems, including continuous adsorption systems, wherein it is desired to remove a selected compound or compounds from multi-component solution by means of a hydrophobic adsorption medium.

The adsorbent can be any material effective to adsorb dissolved components from an aqueous stream, such as industrial effluent or process streams, including streams containing edible and/or biologically active or therapeutic materials. Suitable adsorbents include the macroreticular acrylic and/or styrene and/or divinylbenzene adsorption resins. The resins may be ion exchange resins or they may be devoid of ion exchange functionality; however, it should be understood that this invention applies only to adsorption processes and therefore to the use of ion exchange resins as adsorbents and not solely as ion exchangers.

DESCRIPTION OF THE INVENTION

Adsorbents which are useful for removing caffeine from aqueous coffee extracts (typically 15 to 30% soluble solids), such as the caffeine-laden water extract of green coffee described in U.S. Pat. No. 2,309,092 to Berry et al., hereby incorporated by reference, are the known and commercially available non-ionogenic, macroreticular resins. Particularly useful are the high-surface area, water-insoluble, cross-linked and granular polymers prepared by suspension polymerization of ethylenically unsaturated molecules comprising about 2 to 100, preferably at least 50, weight percent of at least one poly(vinyl) benzene monomer selected from the group consisting of divinylbenzene, trivinylbenzene, alkyl-divinylbenzenes having from 1 to 4 alkyl groups of 1 to 2 carbon atoms substituted in the benzene nucleus, and alkyltrivinylbenzenes having from 1 to 3 alkyl groups of 1 to 2 carbon atoms substituted in the benzene nucleus, which polymer has a porosity of at least 10%, a surface area of at least 10 square meters per gram, and which polymer is not appreciably swollen by caffeine. Besides the homopolymers and copolymers of these poly(vinyl) benzene monomers one or more of them may be copolymerized with up to 98% (by weight of the total monomer mixture) of (1) monoethylenically unsaturated monomer, or (2) polyethylenically unsaturated monomers other than the poly(vinyl) benzenes just defined or (3) a mixture of (1) and (2). Divinylbenzene polymers and styrene/divinylbenzene copolymers have proven particularly useful in the process of this invention.

Adsorbent resins of the aforementioned-type are known and commercially available and more fully described in U.S. Pat. No. 3,531,463 to Gustafson (Rohm & Haas Company) which is hereby incorporated by reference. Other high surface area, hydrophobic adsorbents such as molecular sieves may also be useful in the process of this invention. Suitable adsorbents will be those which exhibit a dipole moment of less than 2.0, preferably less than 0.5 debye.

The process of this invention will be described having reference to the drawing which depicts a five stage adsorption system, including a three stage countercurrent adsorption train.

In a countercurrent, multi-stage adsorption process a plurality of columns are connected in series. Each column or stage contains a fixed bed of adsorbent and the coffee extract to be treated is passed in succession through the plurality of beds which are used stepwise in countercurrent relation to the flow of liquid such that the caffeine-containing coffee extract enters the system (line 10) and is passed through the most spent adsorption bed (stage 2) and exits (line 14) the system through the freshest or least spent adsorption bed (stage 4). Typically the coffee extract is continuously fed to the most loaded (most spent) stage (2) until the capacity of the bed for adsorption of caffeine from the extract stream is approached or reached, that is until the caffeine concentration of the coffee extract exiting this column (line 12) is at or approaches the caffeine concentration of the extract entering (line 11) the column. At this point the extract feed is switched to the next most spent but yet not fully loaded adsorption bed and a fresh adsorption bed (not shown) is added onto the downstream end of the system. The loaded bed or column positioned at stage 2 is shifted to stage 1 and is now, as in conventional countercurrent adsorption processes, completely regenerated with all of the adsorbed solids passing out of the system (line 20) with a desorbent or elution medium.

Before regeneration, it will usually be desirable to feed the loaded bed of stage 1 with an amount of water (line 15) sufficient to displace any low-caffeine extract contained in the column. An additional amount of water sufficient to wash the adsorbent bed of entrapped but non-adsorbed solids may also be employed. The displaced extract and aqueous wash solution could then be fed (line 16) into the adsorption column train together with fresh feed extract (line 10). The stage 1 column is then regenerated by means of a suitable desorbent (line 22). Typically regeneration will be accomplished by an organic solvent which is easily separable from water by such means as distillation, or an aqueous solution of such a solvent such as an aqueous alcohol solution.

The eluted solids, desorbent and typically at least a portion of any rinse water present in stage 1 is passed to fractionator 7 (stream 20) wherein the organic solvent or aqueous solution thereof is recovered for reuse via line 31 and combined with fresh make-up solvent which is supplied as needed via line 32. The aqueous solution of the adsorbed solids is then, if required, concentrated such as in evaporator 8 and then passed to a fresh adsorbtion column (stage 5) which contains the same adsorption medium present in stages 1 through 4. It would of course be possible to directly recycle the latter portions of the eluant (via line 33) for use as the initial amount of desorbent in a subsequent regeneration step, as these latter portions will contain only a low level of eluted solids.

It will next be desirable, especially in food processing applications, to remove all of the elution medium from the adsorbent bed. It would be possible to steam the resin in order to remove all or a portion of the desorbent; preferably however, the desorbent will be displaced by means of one or more water rinses (line 28), at least one of which will preferably be in the reverse direction (not shown). Fresh displacement water may be fed to the system (line 26) and combined with other available water streams, such as the evaporative condensate (line 27) of evaporator 8 and recycled displacement water (line 29).

It will generally be desirable to pass the initial portion of displacement water which exits from the column to fractionator 7 (via line 30) where any solvent contained therein can be recovered for recycle. Following amounts of displacement water, generally about the latter half, which may contain only an extremely low level of solvent, can be recycled (line 29) without treatment to constitute the initial portion of displacement water for the stage 1 column of a subsequent cycle.

The aqueous solution of adsorbed solids (stream 21) fed to stage 5 will, as should be apparent to those skilled in the art, contain a higher level of caffeine (total solids basis) than that present in stage 2 feed stream 11. The solids concentration of stream 21 will be adjusted, such as in evaporator 8, to achieve a higher concentration of caffeine solids than that of stream 11.

Conventional countercurrent adsorption processes would treat stream 21 as a by-product stream and process this stream to recover any valuable materials contained therein. In coffee decaffeination processes, it would, of course, be desirable to recover the caffeine solids contained in stream 21. Unfortunately, however, the selectivity of presently available adsorbents is such that caffeine constitutes only a minor amount of the coffee solids present in stream 21; and in practice this amount has been found to be on the order of about 25% or less by weight. Chemical treatments which are able to separate caffeine from the other adsorbed coffee solids (e.g., chlorogenic acid) either during or after elution will so alter and/or degrade the non-caffeine solids that governmental regulations would not permit their being added-back to the system, such as being combined with the decaffeinated solids of stream 14.

These non-caffeine solids must therefore be treated as waste product and along with constituting a problem of waste disposal represent a loss of coffee solids, amounting to approximately three times the amount of recovered caffeine. This large loss of coffee solids cannot be tolerated on an economic basis. Present commercial decaffeination systems, such as that of the aforementioned Berry et al. patent, are able to operate such that the amount of non-caffeine solids lost approximately equals the amount of caffeine recovered.

According to the process of this invention, it has now been found that, surprisingly, the solids adsorbed on a particular adsorbent medium from a multi-component aqueous solution and then eluted from the adsorbent, when contacted with a fresh bed of the same adsorbent, readsorb according to a different and more desirable distribution pattern. It has been discovered that the component which is most preferentially adsorbed during the first contact with the adsorbent can be concentrated by passing the adsorbed solids through an additional bed of adsorbent. Specifically, it has been found, notwithstanding the fact that caffeine is known to complex with certain non-caffeine solids present in coffee extracts, most notably chlorogenic acid, which will be present in the eluted solids at a weight level comparable to that of caffeine, that caffeine-containing coffee solids adsorbed from an aqueous coffee extract by a hydrophobic adsorption resin are readsorbed by a fresh adsorption bed of the same resin such that caffeine is further concentrated in the resin bed and that additional caffeine-free coffee solids can be obtained.

Referring to the drawing again, it is found that as stream 21 is fed to stage 5, the initial solids exiting in aqueous stream 40 will be essentially caffeine-free and that this stream could, if desired, be combined (via line 41) with caffeine-free stream 14. A following amount of stream 40 can be obtained which has a relatively low level (total solids basis) of caffeine, and this solution can be combined (via line 42) with feed stream 10 as a means for further recovering non-caffeine coffee solids.

Depending upon the size of adsorbent bed of stage 5, it will be possible to use a particular stage 5 for more than one cycle before regeneration is necessary. In operation it has been found that if the stage 5 adsorbent bed is the same size as the adsorbent beds of stages 1 to 4, then the eluted solids of two stage 1 columns (i.e., two cycles) can be passed to a single stage 5 adsorbtion bed before significant amounts of caffeine will be detected in stream 40. In operation it may be desirable to limit the amount of stream 21 fed to stage 5 so that little or no caffeine exits the column. In this manner all of stream 40 may be combined with caffeine-free stream 14 and there will be no stream 42. Alternatively stage 5 may be fed by stream 21 until the adsorbent bed is at or approaches saturation. Typically it would take about 7 to 10 cycles of eluted solids to saturate a stage 5 adsorbent bed which is of equal size to the beds of stages 1 to 4.

After the stage 5 adsorption bed is loaded to the desired level, regeneration will be effected. As described previously in connection with stage 1 regeneration, a water displacement and wash (not shown) of loaded stage 5 may be employed prior to eluting the resin bed. In this event the displaced liquid and a portion of the wash solution could constitute or be added to stream 41 and/or 42. Elution of the adsorbed solids will proceed along the pattern employed for stage 1 elution. The desorbent will be fed to the resin bed via line 43 and eluted solids together with the desorbent and at least a portion of the aqueous liquid present in the column is passed to fractionator 7' via line 44. Desorbent is recovered for reuse (stream 43) and an aqueous solution of eluted solids (stream 45) is obtained which contains a relatively high level of caffeine, solids basis. As described previously, an end portion of the eluant, containing a low level of solids, may be directly recycled for use as the initial amount of desorbent for a subsequent regeneration step.

As will be apparent to those skilled in the art, caffeine can be recovered, such as by conventional caffeine refining techniques, as a valuable by-product from the eluted solids of stream 45 and the non-caffeine solids may be discarded. Alternatively, it would of course be possible to send stream 45 to another fresh adsorbent bed where again caffeine will be concentrated and non-caffeine solids suitable for add-back will be obtained. By employing a plurality of successive recovery stages, essentially pure caffeine can be obtained and virtually all non-caffeine solids could be recovered for add-back. Economics would, of course, determine at what point it is more practical to discard non-caffeine solids rather than recover them for add-back.

After elution of stage 5 is completed, the elution medium is displaced with water (line 46). As described for stage 1 displacement, a first portion of the displacement water exiting the stage 5 column (line 47) may be passed to the fractionator 7' and a second portion directly recycled.

It has been found that the process of this invention is most effective when the solids concentration of stream 21 which is fed to the stage 5 column is about equal to the solids concentration of the stage 2 feed stream 11. Typically the total solids concentration of stream 21 will be from about 10 to 35% by weight. Further it has been found that the amount of caffeine which can be returned (via line 42) to the adsorption train from the recovery stage 5 should not greatly exceed the amount of caffeine present in the feed extract (line 10). Typically the weight ratio of caffeine fed to stage 2 via line 10 to the amount of caffeine fed via line 42, herein defined as the reflux ratio is about from 0.1:1 to 5:1, and typically about 0.5:1 to 1.5:1.

As will be recognized by those skilled in the art, numerous holding tanks, valves and similar standard equipment, although not shown, may be provided as dictated by standard chemical process design techniques.

A preferred embodiment of the invention is described in the following Example, all percentages being in terms of weight percent and the Example describing a system as shown in the Figure, operating in a countercurrent mode at equilibrium conditions.

EXAMPLE

Each stage of the five column adsorption system contains 480 grams of hydrated non-ionogenic, macroreticular adsorbtion resin of the polydivinylbenzene type (Amerlite XAD-4 of Rohm & Haas Company), providing a bed volume of 540 cc which bed contains a void volume of about 50%. Stream 10 (at 4.34 bed volumes and 180° F.) consisting of an aqueous extract (23.2% solids concentration, 0.26% caffeine concentration) of green coffee as described in the aforementioned Berry et al. patent, is combined with the stream 16 wash (1.5 bed volumes) of a stage 1 column and fed to spent stage 2. Caffeine solids together with non-caffeine solids were adsorbed onto each of the resin beds 2, 3 and 4 as the coffee extract flowed through the adsorbtion train which is connected by means of lines 12 and 13. The extract exiting the system, stream 14, was found to be essentially free of caffeine.

During each cycle, the stage 1 column is fed with 1.5 bed volumes of water (270 cc.) via line 15 and the displaced extract together with one bed volume of wash solution is fed via line 16 to be combined with feed extract 10. Each stage 1 column which contain about 33 grams of adsorbed solids, of which about 26.4% are caffeine and about 23.7% are chlorogenic acid, and one-half bed volume of aqueous solution is next fed with 3 bed volumes of dilute (40% water) ethanol (stream 22) having a temperature of about 170° F. to desorb essentially all the solids and the resulting eluant stream 20 is fractionated at 7 to remove and recover aqueous alcohol. The resulting aqueous solutions from two successive stage 1 columns is then concentrated in evaporator 8 to a volume of 0.5 bed volumes (270 cc.) resulting in a solids concentration of 22%. This concentrated solution which contains 5.8% caffeine concentration is fed via line 21 to fresh stage 5 and is followed by a 1.5 bed volume water wash. Approximately 29 grams of essentially caffeine-free solids (about 19% chlorogenic acid) in 1.5 bed volume of solution is obtained from stage 5 as stream 40 which solution, preferably after concentration, can be combined (via line 41) with the decaffeinated extract of line 14. Elution of stage 5 with dilute (40% water) ethanol (fed via line 43) results in an elutant (line 44) containing 42.75% caffeine on a solids basis.

It is thus seen that the caffeine level of the solids which are removed from the decaffeination system is increased from 26.4 to 42.75% by passing the eluted solids of stage 1 through fresh recovery stage 5. Thus for each pound of caffeine removed from stage 1 in line 20 about 2.9 pounds of non-caffeine solids are removed; whereas for each pound of caffeine removed from stage 5 in line 44 only 1.36 pounds of non-caffeine solids are lost. This represents a savings in non-caffeine coffee solids of about 53% which constitutes a significant economic advantage for the process of this invention.

Comparable results may also be achieved when the decaffeination of aqueous extracts of roasted coffee is desired; however before the extract is contacted with the adsorbent resin, it will be preferable to remove the volatiles from the extract by such means as steam stripping. The volatiles are retained and added-back to the decaffeinated coffee extract at a subsequent processing stage.

What is claimed is:

1. A countercurrent adsorption process for separating a preferentially adsorbed component from an aqueous multi-component solution which contains additional compounds which are also adsorbed comprising the steps of:

(a) passing the multi-component solution to the most spent section of a countercurrent multi-section adsorption system until the capacity of the most loaded adsorbent for adsorbtion of the preferential adsorbed component is substantially reached and withdrawing from the least spent section of the adsorption system an aqueous solution substantially-free of the preferentially adsorbed component, thereafter (b) adding fresh adsorbent to the least spent section of the countercurrent adsorption system and passing the multi-component solution to a new most spent section of the countercurrent adsorption system, (c) isolating the loaded adsorbent of step (a) and passing a desorbent through this adsorbent in order to obtain an effluent containing desorbed solids, said solids having, on a dry basis, a higher level of the preferentially adsorbed component than that present in the multi-component solution of step (a), (d) removing the desorbent from the effluent of step (c) in order to obtain an aqueous solution of desorbed solids, (e) passing the aqueous solution of step (d) through a fresh bed of the same adsorbent used in step (a), and obtaining an effluent at least the initial portion of which is substantially-free of the preferentially adsorbed component, and thereafter (f) passing a desorbent through the bed of step (e) in order to obtain an effluent containing desorbed solids, said solids having on a dry basis, a higher level of the preferential adsorbed component than that present in the effluent of step (c).

2. The process of claim 1 wherein the adsorbent is comprised of non-ionogenic, macroreticular, cross-linked resin particles.

3. The process of claim 2 wherein the desorbents of steps (c) and (f) is an organic solvent of an aqueous solution thereof.

4. The process of claim 2 wherein the adsorbent is an acrylic, styrene, divinylbenzene or combinations thereof resin.

5. The process of claim 2 wherein the adsorbent is a divinylbenzene polymer or a styrene/divinylbenzene copolymer.

6. The process of claim 1 wherein the countercurrent adsorption system is a multi-stage, fixed-bed adsorption train.

7. The process of claim 1 wherein that portion of the effluent of step (e) which is substantially-free of the preferentially adsorbed component is combined with the aqueous solution of step (a) obtained from the adsorption system.

8. The process of claim 1 wherein the solids concentration of the multi-component solution of step (a) is from 15 to 30% by weight and the solids concentration of the aqueous solution of step (d) is from 10 to 35% by weight.

9. The process of claim 8 wherein the solids concentration of the aqueous solution of step (d) is about equal to the solids concentration of the multi-component solution of step (a).

10. The process of claim 8 wherein the multi-component solution is an aqueous extract of green or roasted coffee.

* * * * *